United States Patent
Chen et al.

(10) Patent No.: US 6,533,411 B1
(45) Date of Patent: Mar. 18, 2003

(54) EYEGLASS ASSEMBLY HAVING A COUPLING UNIT FOR COUPLING PRIMARY AND AUXILIARY EYEGLASSES

(76) Inventors: Paul Chen, 2485 Roanoke Ave., San Marino, CA (US) 91108; Hung-Ming Huang, 1F, No. 18, Alley 36, Lane 233, Sec. 2, Chung-Hua S. Rd., Tainan City (TW)

( * ) Notice: Subject to any disclaimer, the term of this patent is extended or adjusted under 35 U.S.C. 154(b) by 0 days.

(21) Appl. No.: 10/058,560

(22) Filed: Jan. 28, 2002

(51) Int. Cl.[7] .................................................. G02C 9/00
(52) U.S. Cl. ........................... 351/47; 351/57; 351/140; 351/148
(58) Field of Search ............................ 351/47, 48, 57, 351/58, 140, 148, 152

(56) References Cited

U.S. PATENT DOCUMENTS 5,936,700 A * 8/1999 Masunaga ................... 351/47
6,244,704 B1 * 6/2001 Xiao ............................ 351/47

* cited by examiner

Primary Examiner—Huy Mai

(57) ABSTRACT

An auxiliary eyeglass is mounted frontwardly on a primary eyeglass having a primary bridge interconnecting two primary lenses. The auxiliary eyeglass includes two auxiliary lenses disposed frontwardly of and aligned with the primary lenses respectively. A coupling unit includes a hook member hooked on the primary bridge, a first threaded unit extending in a transverse direction relative to the primary bridge and the hook member and selectively connected to one of the hook member and the auxiliary lenses, and a mounting unit selectively connected to the other one of the hook member and the auxiliary lenses with the first threaded unit extending through the mounting unit. A second threaded unit is mounted threadedly on the first threaded unit and adjustably abuts against two opposite sides of the mounting unit so as to permit adjustment and positioning of the auxiliary lenses relative to the primary lenses.

3 Claims, 7 Drawing Sheets

EYEGLASS ASSEMBLY HAVING A COUPLING UNIT FOR COUPLING PRIMARY AND AUXILIARY EYEGLASSES

BACKGROUND OF THE INVENTION

1. Field of the Invention

This invention relates to a pair of eyeglasses, more particularly to an assembly of primary and auxiliary eyeglasses which are coupled to each other via a coupling unit.

2. Description of the Related Art

Referring to FIG. 1, a conventional eyeglass assembly is shown to include a pair of primary eyeglasses 4 and a pair of auxiliary eyeglasses 3. The primary eyeglasses 4 includes two primary lenses 41, a primary bridge 42 that interconnects the primary lenses 41, and two temples 43 respectively connected to the primary lenses 41. The auxiliary eyeglasses 3 is disposed frontwardly of the primary eyeglasses 4, and includes two auxiliary lenses 32 respectively aligned with the primary lenses 41, and an auxiliary bridge 31 that is aligned with the primary bridge 42, and that has an anchor portion 313 disposed rearwardly of the primary bridge 42, and a pair of connecting rods 312 extending integrally from the anchor portion 313 and connected securely to the auxiliary lenses 32 so as to define a bridge-receiving space between the anchor portion 313 and the auxiliary lenses 32 for receiving the primary bridge 42 when the auxiliary eyeglasses 3 is mounted on the primary eyeglasses 4.

One drawback of the aforesaid conventional eyeglass assembly resides in that the auxiliary eyeglasses 3 is only suitable for use with a specific primary eyeglass 4, since the dimensions of the bridge-receiving space cannot be changed.

In order to eliminate the above-mentioned drawback, another conventional eyeglass assembly has been proposed, and is shown in FIGS. 2 and 3 to include a pair of primary eyeglasses 2 and a pair of auxiliary eyeglasses 1. The primary eyeglasses 2 includes two primary lenses 21, a primary bridge 22 that interconnects the primary lenses 21, and two temples 23 respectively and pivotally connected to the primary lenses 21. The auxiliary eyeglasses 1 is disposed frontwardly of the primary eyeglass 2, and includes two auxiliary lenses 11 respectively aligned with the primary lenses 21, and a coupling rod unit 12 having two clamps 121 respectively clamping the auxiliary lenses 11, a bridging rod 123 bridging the clamps 121, and a pair of sticks 124 that extend from the clamps 121 toward the primary lenses 21 and that can be folded to hook on upper portions of the primary lenses 21 so as to prevent untimely removal of the auxiliary eyeglasses 1 from the primary eyeglasses 2.

Although the auxiliary eyeglasses 1 is adapted to be mounted on the primary eyeglasses 2 having the primary bridge 22 of different thickness, it is relatively difficult to accurately bend the sticks 124 in order to hook properly on the primary lenses 21. Moreover, the sticks 124 are susceptible to breaking.

SUMMARY OF THE INVENTION

The object of this invention is to provide a relatively simple assembly of primary and auxiliary eyeglasses with a coupling unit that is capable of overcoming the aforesaid drawbacks as encountered in the prior art.

Accordingly, an auxiliary eyeglass assembly of the present invention is adapted to be mounted frontwardly on a pair of primary eyeglass assembly which includes a primary bridge interconnecting two primary lenses, and two temples respectively connected to the primary lenses. The auxiliary eyeglass assembly accordingly includes two auxiliary lenses and a coupling unit. The auxiliary lenses are adapted to be disposed frontwardly of and aligned with the primary lenses respectively. The coupling unit includes a hook member adapted to be hooked on the primary bridge, a first threaded unit extending in a transverse direction relative to the primary bridge and the hook member and selectively connected to one of the hook member and the auxiliary lenses, and a mounting unit selectively connected to the other one of the hook member and the auxiliary lenses with the first threaded unit extending through the mounting unit. The coupling unit further includes a second threaded unit mounted threadedly on the first threaded unit and adjustably abutting against two opposite sides of the mounting unit so as to permit adjustment and positioning of the auxiliary lenses relative to the primary lenses.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
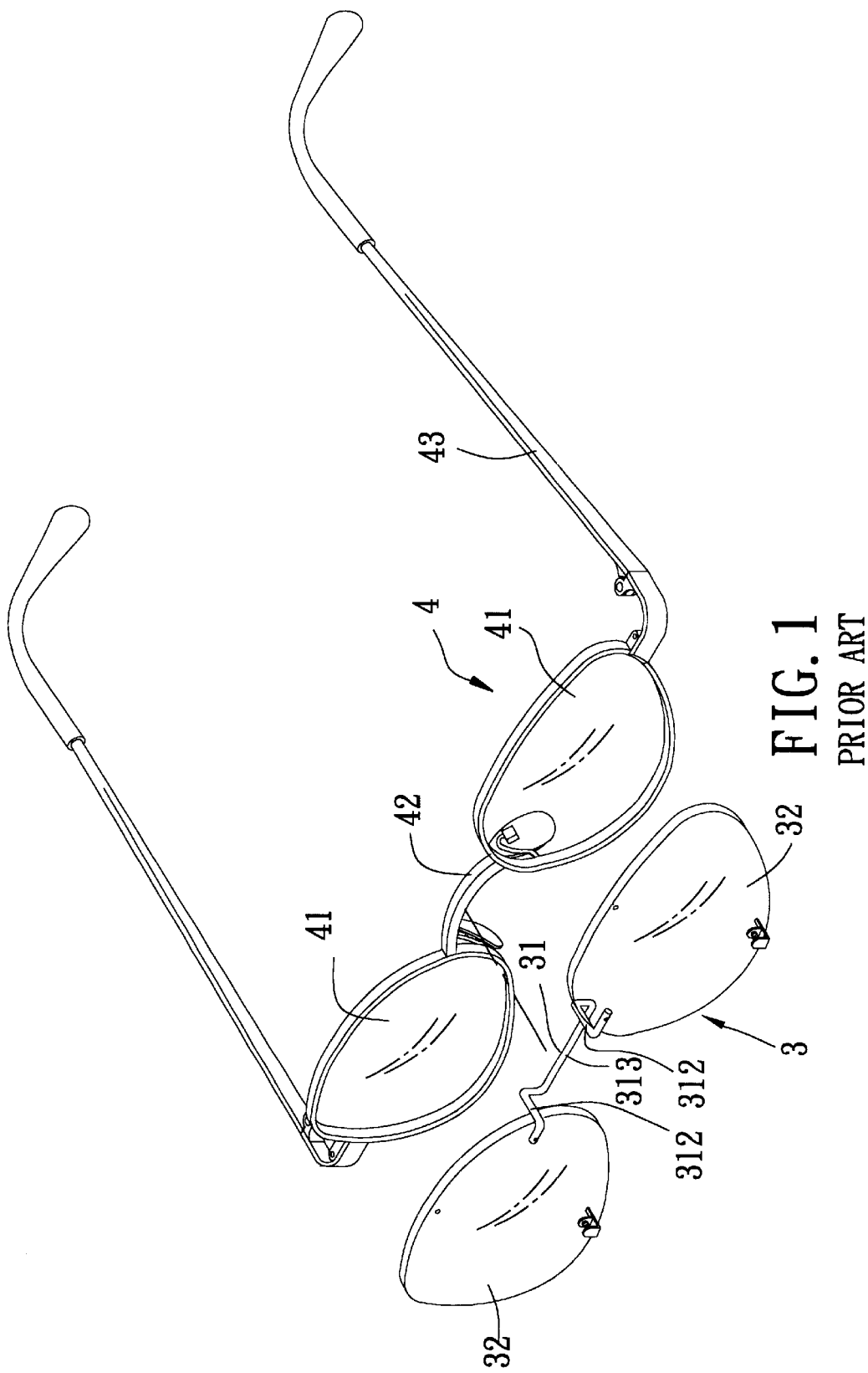
FIG. 1 is a perspective and partly exploded view of a conventional eyeglass assembly.
Figure 2:
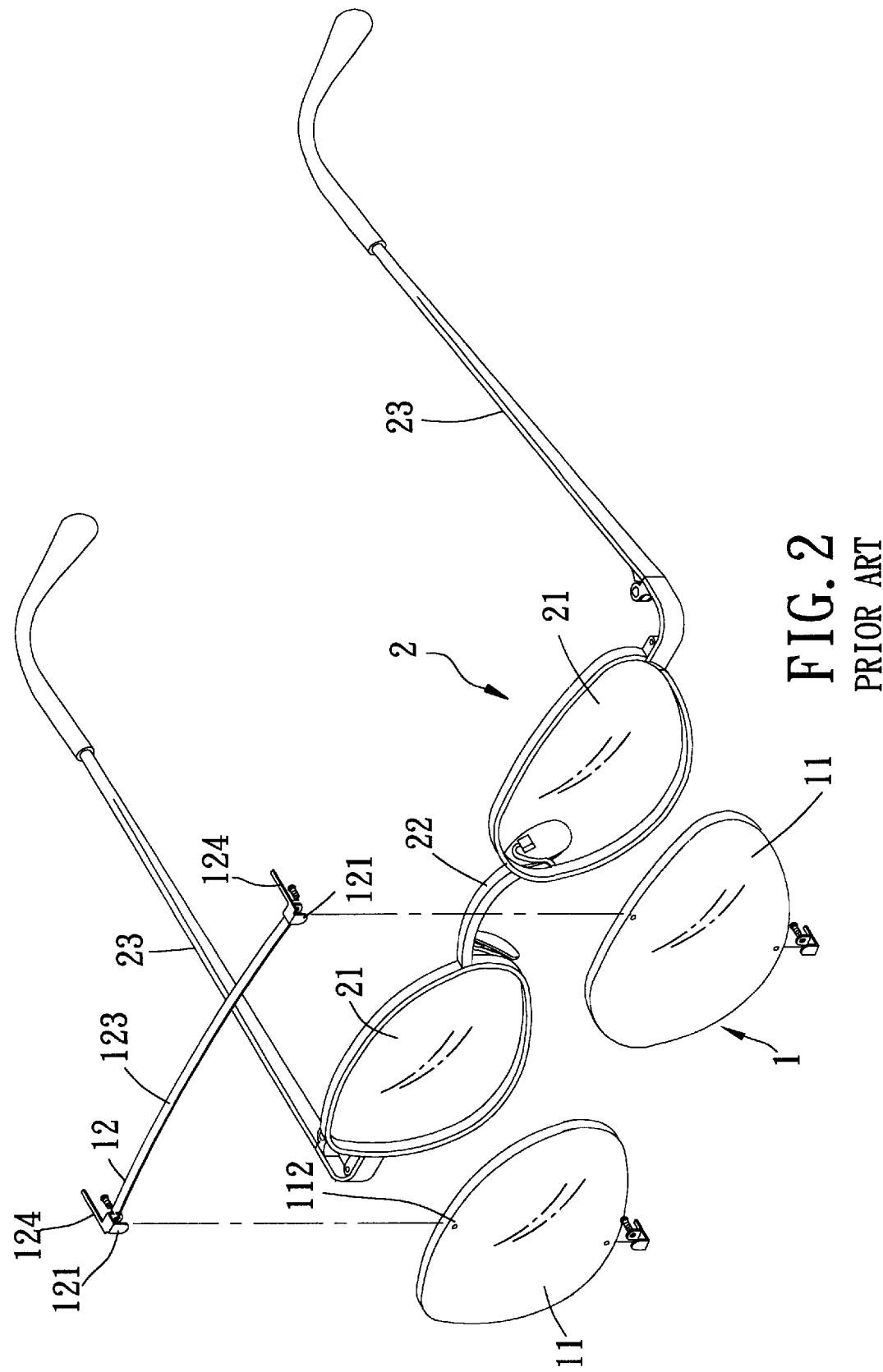
FIG. 2 is a perspective and partly exploded view of another conventional eyeglass assembly.
Figure 3:
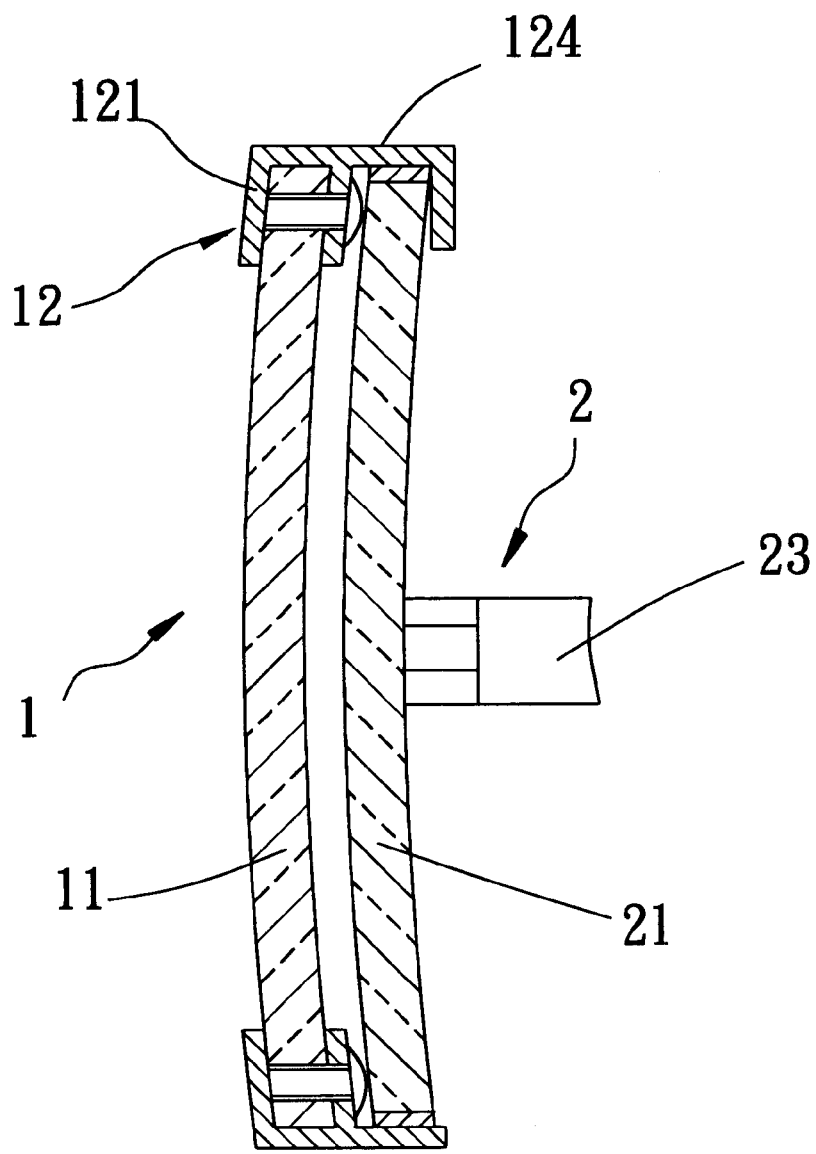
FIG. 3 is a fragmentary sectional view of the conventional eyeglass assembly shown in FIG. 2.
Figure 4:
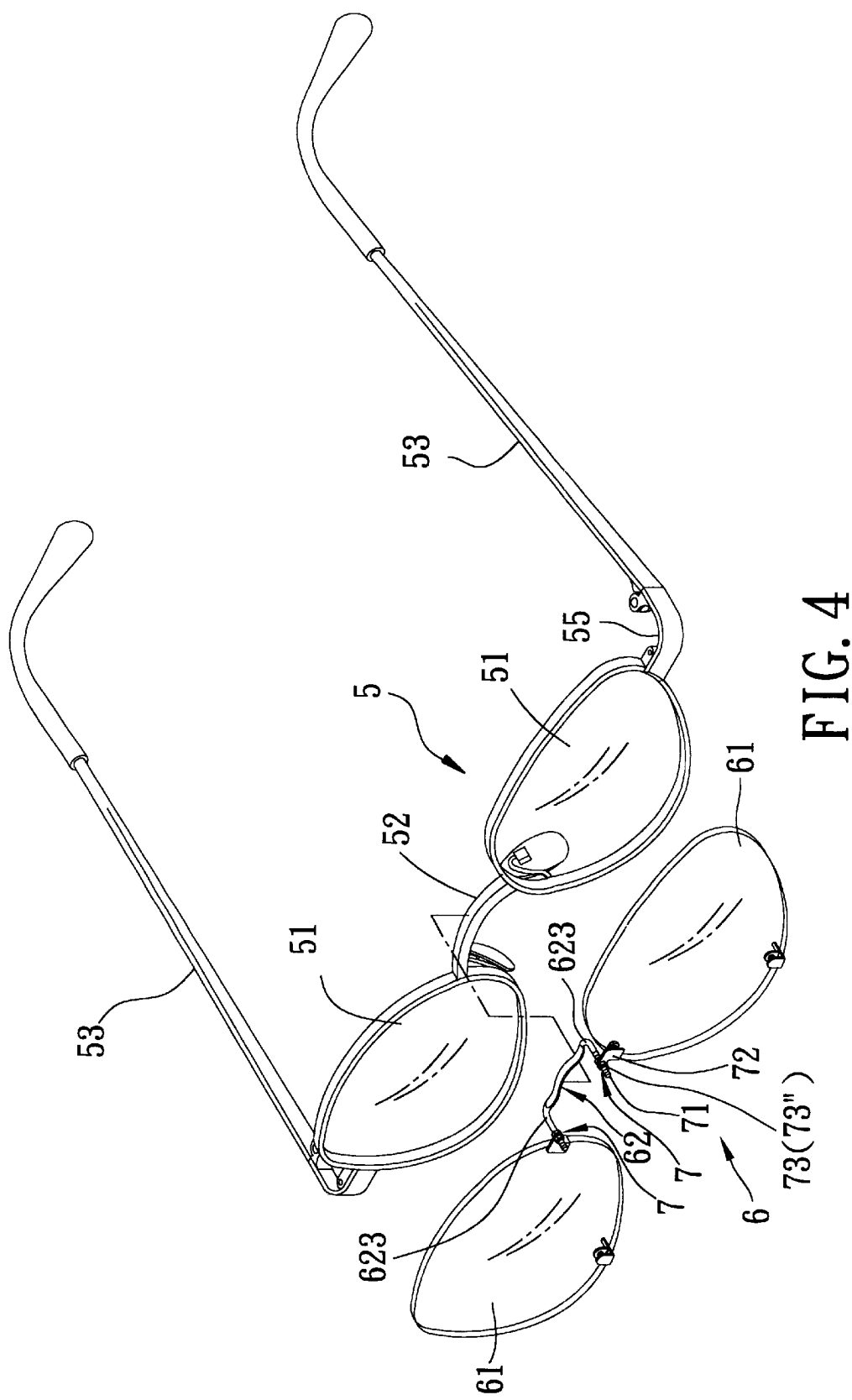
FIG. 4 is a perspective and partly exploded view of a preferred embodiment of a pair of eyeglass assembly according to the present invention.
Figure 5:
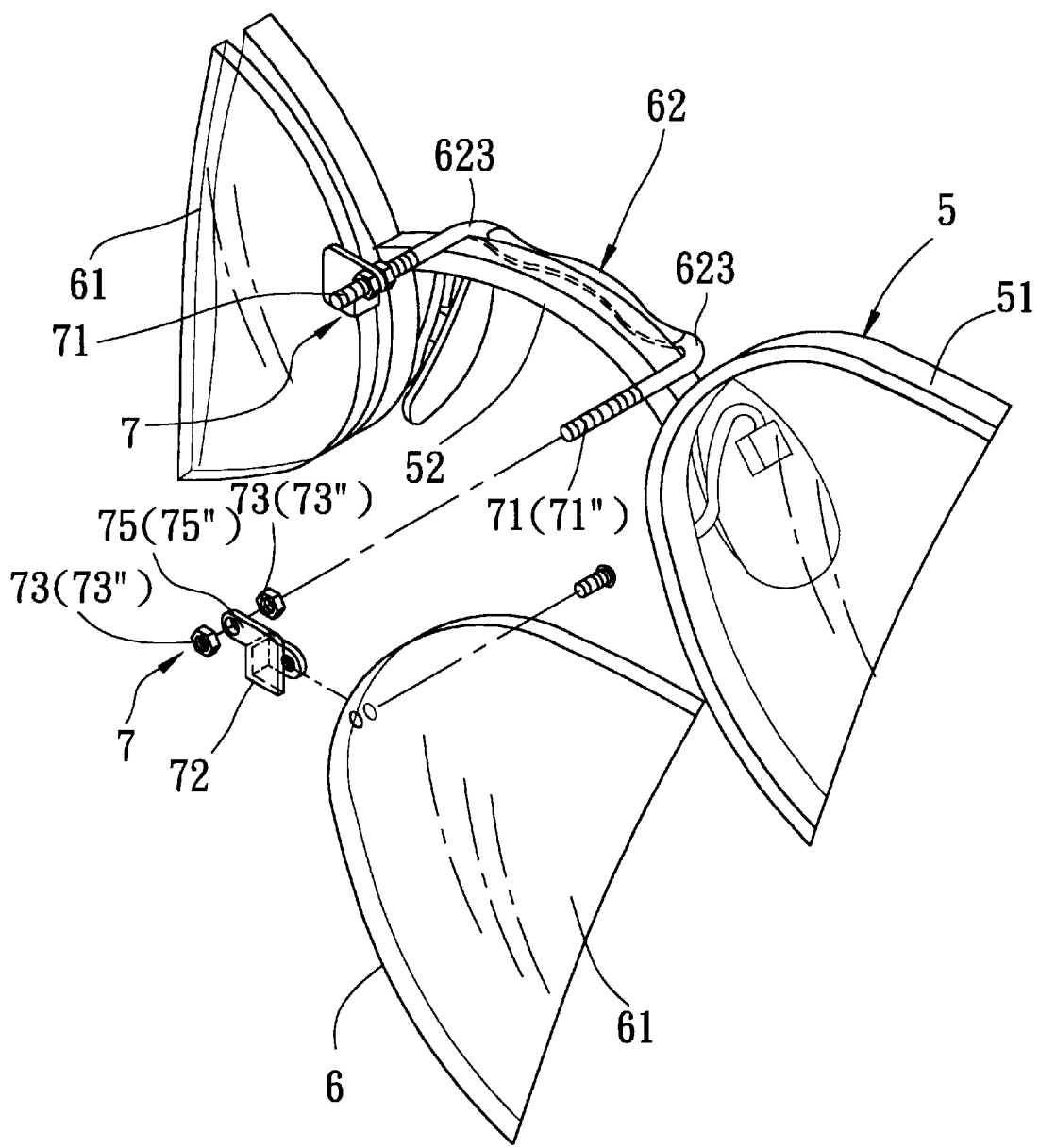
FIG. 5 is an enlarged fragmentary perspective view of the preferred embodiment, illustrating how a pair of auxiliary eyeglasses is retained on a pair of primary eyeglasses.
Figure 6:
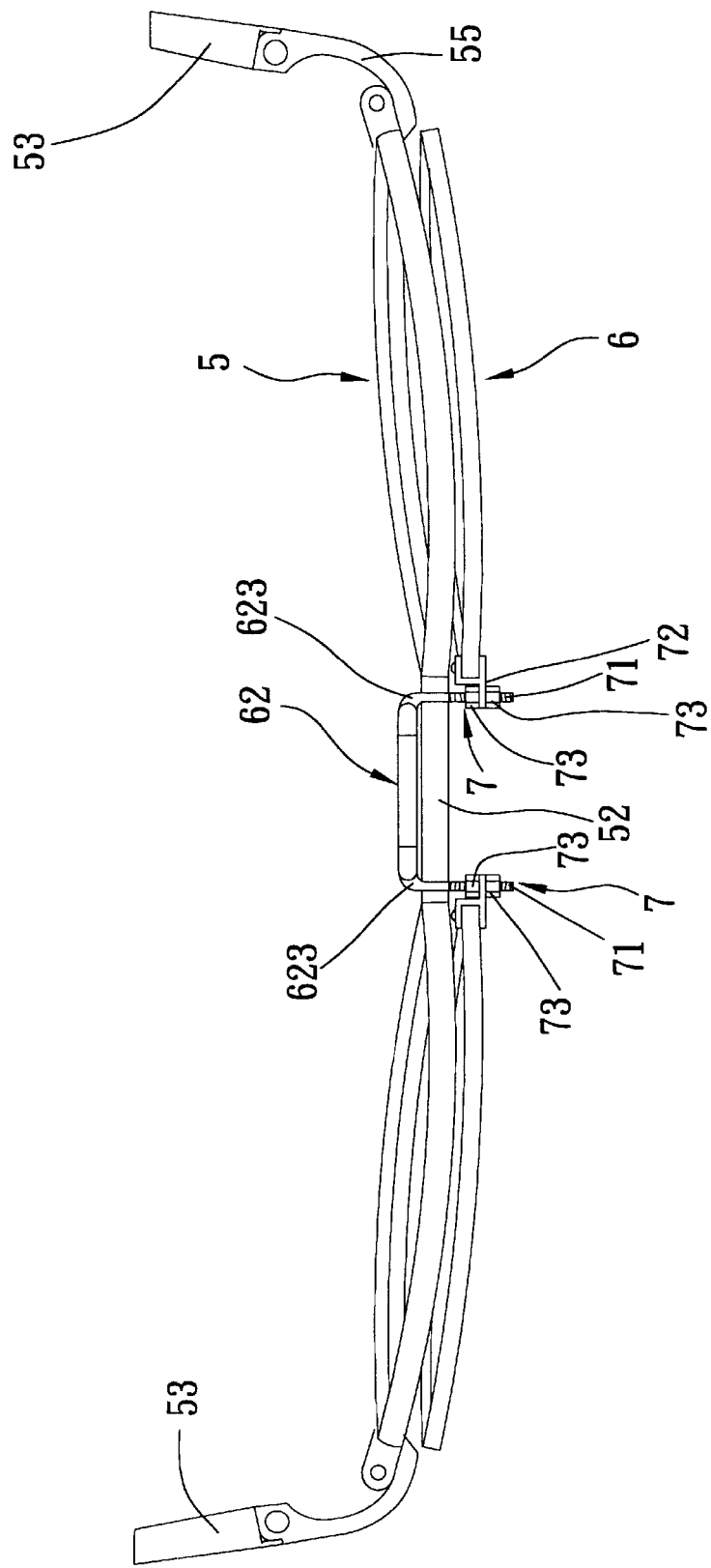
FIG. 6 is a top view of the preferred embodiment, illustrating how the pair of auxiliary eyeglasses is retained on the pair of primary eyeglasses.

Referring to FIGS. 4, 5 and 6, a preferred embodiment of an eyeglass assembly according to the present invention is shown to include a pair of primary eyeglass assembly 5, a pair of auxiliary eyeglass assembly 6, and a coupling unit 7 for detachably coupling the pair of auxiliary eyeglass assembly 6 onto the primary eyeglass assembly 5.

As illustrated, the primary eyeglass assembly 5 has front and rear sides, and includes two framed primary lens units that confine two primary lenses 51 respectively therein, and that have inner sides, a primary bridge 52 that interconnects the inner sides of the primary lens units, and two temples 53 respectively connected to the primary lens units via two connecting plates 55.

The auxiliary eyeglass assembly 6 is disposed frontwardly of the primary eyeglass assembly 5, and includes two auxiliary lenses 61 respectively aligned with the primary lenses 51, and a coupling unit 7.

The coupling unit 7 includes a hook member 62, a first threaded unit 71, a mounting unit 75, and a second threaded unit 73. The hook member 62 is hooked on the primary bridge 52. The first threaded unit 71 extends in a transverse direction relative to the primary bridge 52 and the hook member 62 and selectively connected one of the hook member 62 and the auxiliary lenses 61. The mounting unit 75 is selectively connected to the other one of the hook member 62 and the auxiliary lenses 61, and permits extension of the first threaded unit 71 therethrough. The second threaded unit 73 is mounted threadedly on the first threaded unit 71 and adjustably abuts against two opposite sides of the mounting unit 75 in such a manner to permit adjustment and positioning of the auxiliary lenses 61 relative to the primary lenses 51 (see FIG. 6).

The hook member 62 is generally U-shaped, and has two opposite ends 623. The first threaded unit 71 includes two threaded shafts 71" respectively pass over the top of the primary bridge 52, and have two fastener ends connected integrally and respectively to the opposite ends 623 of the hook member 62. The mounting unit 75 includes a pair of mounting plates 75" respectively and slidably mounted on the threaded shafts 71". The second threaded unit 73 includes two pairs of fastener nuts 73" that are respectively and threadedly mounted on the threaded shafts 71" and that respectively abut against the mounting plates 75". The coupling unit 7 further includes a pair of clamps 72 which respectively clamp the auxiliary lenses 61 and which are integrally and respectively connected to the mounting plates 75".

Figure 7:
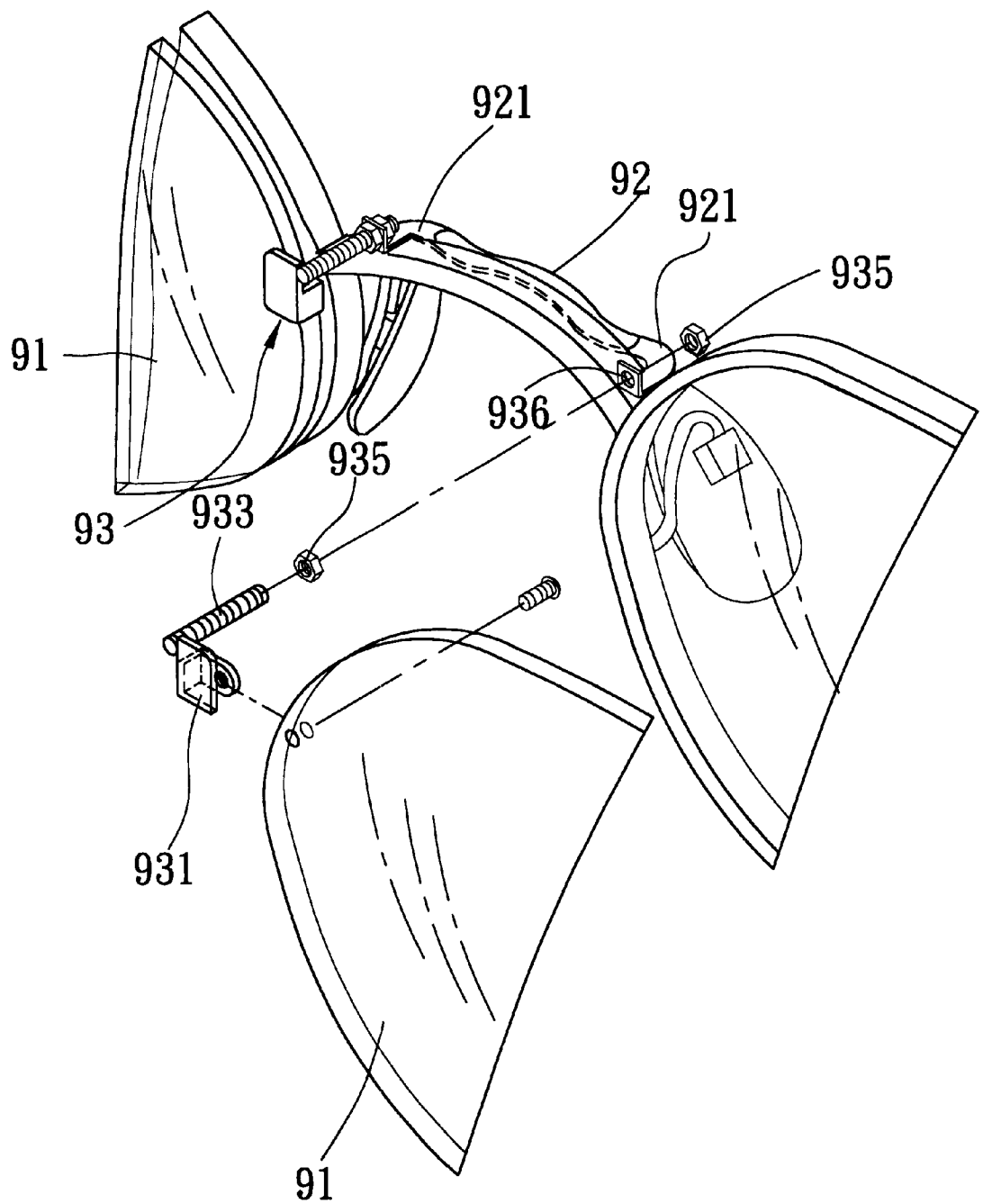
FIG. 7 is an enlarged fragmentary perspective view of a modified preferred embodiment, illustrating how a pair of auxiliary eyeglasses is retained on a pair of primary eyeglasses.

FIG. 7 shows a modification of the preferred embodiment, which has a structure similar to the previous embodiment. The main difference resides in that the mounting unit includes a pair of mounting plates 936 respectively connected to two opposite ends 921 of the hook member 92. The first threaded unit includes two threaded shafts 933 that extend through the mounting plates 936 respectively. The second threaded unit includes two pairs of fastener nuts 935 that are respectively and threadedly mounted on the threaded shafts 933 and that respectively abut against the mounting plates 936. The coupling unit further includes a pair of clamps 931 which respectively clamp the auxiliary lenses 91 and which are integrally and respectively connected to the threaded shafts 933.

With this invention thus explained, it is apparent that numerous modifications and variations can be made without departing from the scope and spirit of this invention. It is therefore intended that this invention be limited only as indicated by the appended claims.

We claim:

1. An auxiliary eyeglass assembly adapted to be mounted frontwardly on a pair of primary eyeglass assembly, which has front and rear sides, and which includes two primary lenses, a primary bridge that interconnects the primary lenses, and two temples respectively connected to the primary lenses, said auxiliary eyeglass assembly comprising:

two auxiliary lenses adapted to be aligned with the primary lenses respectively; and a coupling unit including a hook member adapted to be hooked on the primary bridge, a first threaded unit extending in a transverse direction relative to the primary bridge and said hook member and selectively connected to one of said hook member and said auxiliary lenses, and a mounting unit selectively connected to the other one of said hook member and said auxiliary lenses, said first threaded unit extending through said mounting unit, said coupling unit further including a second threaded unit mounted threadedly on said first threaded unit and adjustably abutting against two opposite sides of said mounting unit so as to permit adjustment and positioning of said auxiliary lenses relative to the primary lenses.

2. The auxiliary eyeglass assembly as defined in claim 1, wherein said first threaded unit includes a pair of threaded shafts integrally and respectively connected to two opposite ends of said hook member, said mounting unit including a pair of mounting plates respectively and slidably mounted on said threaded shafts, said second threaded unit including two pairs of fastener nuts that are respectively and threadedly mounted on said threaded shafts and that respectively abut against said mounting plates, said coupling unit further including a pair of clamps respectively clamping said auxiliary lenses and integrally and respectively connected to said mounting plates.

3. The auxiliary eyeglass assembly as defined in claim 1, wherein said mounting unit includes a pair of mounting plates respectively connected two opposite ends of said hook member, said first threaded unit including a pair of threaded shafts extending through said mounting plates, said second threaded unit including two pairs of fastener nuts that are respectively and threadedly mounted on said threaded shafts and that respectively abut against said mounting plates, said coupling unit further including a pair of clamps respectively clamping said auxiliary lenses and integrally and respectively connected to said threaded shafts.

* * * * *